US007250218B2

(12) United States Patent
Hovius et al.

(10) Patent No.: US 7,250,218 B2
(45) Date of Patent: Jul. 31, 2007

(54) METHOD OF PROVIDING A MARKING ON A SUBSTRATE

(75) Inventors: Jan Auke Hovius, Drachten (NL); Dirk Herbert J han Teeuw, Drachten (NL); Ytsen Wielstra, Drachten (NL); Jolanda Harma Sagitta Winkel, Drachten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 518 days.

(21) Appl. No.: 10/638,515

(22) Filed: Aug. 11, 2003

(65) Prior Publication Data

US 2004/0047996 A1 Mar. 11, 2004

Related U.S. Application Data

(62) Division of application No. 09/709,259, filed on Nov. 9, 2000, now Pat. No. 6,627,247.

(30) Foreign Application Priority Data

Nov. 9, 1999 (EP) ................................. 99203745

(51) Int. Cl.
*B32B 25/20* (2006.01)

(52) U.S. Cl. ....................... 428/447; 428/450; 524/588

(58) Field of Classification Search ................ 428/447, 428/450; 524/588
See application file for complete search history.

(56) References Cited

U.S. PATENT DOCUMENTS

| | | | | | |
|---|---|---|---|---|---|
| 4,176,361 | A | * | 11/1979 | Kawada et al. ............. | 347/100 |
| 5,971,535 | A | * | 10/1999 | Kellett ........................ | 347/96 |
| 6,194,075 | B1 | * | 2/2001 | Sargeant et al. ......... | 428/32.38 |

FOREIGN PATENT DOCUMENTS

| | | |
|---|---|---|
| WO | 98/13434 | 4/1998 |
| WO | 98/22548 | 5/1998 |

* cited by examiner

*Primary Examiner*—Kuo-Liang Peng
(74) *Attorney, Agent, or Firm*—Adam L. Stroud

(57) ABSTRACT

Method of applying a marking or image on a substrate which is provided with a coating by means of a sol-gel process. After the application of a layer of a sol-gel solution on the substrate, an ink which is compatible with the sol-gel is applied on the wet layer. The ink penetrates into the layer and then the layer is cured to form the coating.

23 Claims, No Drawings

METHOD OF PROVIDING A MARKING ON A SUBSTRATE

CROSS REFERENCE TO RELATED APPLICATION

This is a divisional of prior application Ser. No. 09/709,259 filed Nov. 9, 2000 now U.S. Pat. No. 6,627,247.

The invention relates to a method of providing a marking on a substrate which is provided with a coating obtained in a sol-gel process.

The provision of markings or images on the substrate mentioned above is often performed by means of tampon printing. The advantage of tampon printing is that inks of many colors can be used. Tampon printing provides a very wide freedom in the use of colors, while in addition it is a comparatively inexpensive process. A disadvantage is that tampon printing is an inflexible process as regards the shape of the substrate and of the image. The process can be used on substrates of planar shape, and also still of slightly curved shape. However, as soon as the substrate has a somewhat complicated three-dimensional shape, it becomes very difficult if not impossible to apply this process. Another method of applying markings or inscriptions involves the use of a laser. In laser marking, the laser can be controlled in any manner desired such that complicated surfaces can also be provided with markings. Laser marking is a flexible process in that respect. The freedom of choice of colors, however, is very limited in laser marking. Only few colors can be used owing to the limited number of pigments in the coloring agent. Laser marking is mostly used for providing technical inscriptions, such as the type number of a device.

It is an object of the invention to provide a method by which a marking is provided on a sol-gel coating of a substrate which affords a high degree of freedom in color choice, which method is flexible as regards its use on complicated shapes of the substrate and of the image, while the marking or image obtained has a high resistance to wear.

The invention is for this purpose characterized in that, after the provision of a layer of a sol-gel solution on the substrate, an ink compatible with the sol-gel is provided on said layer, which ink subsequently penetrates into the layer, whereupon finally the layer is cured so as to form a coating.

A layer of a sol-gel solution is provided on the substrate, for example by means of dip coating or spray coating. Then an ink is provided on the still somewhat moist sol-gel layer, which ink can penetrate into the sol-gel layer. So the ink does not remain on the surface of the sol-gel layer, but penetrates into it and after some time will lie entirely inside the sol-gel layer. The moment the ink is provided has an influence on the quality of the marking. If the ink is provided on a sol-gel layer which is too wet, the ink will flow out and a blurred image will be obtained. If the ink is provided after a too long waiting time, however, the ink will penetrate insufficiently into the sol-gel layer. It is found then after curing that the ink can be easily removed. The solvent of the sol-gel solution in the layer must have been sufficiently removed before the ink is provided, so that flowing-out of the ink is prevented as much as possible. Curing of the sol-gel layer converts the sol-gel layer into a polymer in a polymerization process. The marking has a high degree of wear resistance because the coloring agents or pigments are present entirely inside the layer. The wear resistance is much greater than in the case of tampon printing. The method is in fact suitable for inks of a wide variety of colors and can be implemented with various contactless spraying techniques, so that also 3D surfaces can be provided with images in a simple manner. Sol-gel solutions which are suitable for the provision of a marking or image in the manner described above are known from WO 98/13434 and WO 98/22548.

The sol-gel layer is preferably dried before the ink is provided. The optimum drying time is dependent on inter alia the type of sol-gel and the type of image. If the image has large, even surfaces, a longer drying time will be necessary than if the image comprises thin lines or dots. The drying time may be shorter in the case of drying at a higher temperature than at room temperature or in the case of forced drying (by air flow).

Preferably, the ink is provided in an ink jet process, for example, by a thermal ink jet technology, but a piezo ink jet technology is alternatively also possible. A normal spraying process could also be used.

Inks with organic coloring agents or pigments may be used. The advantage of organic inks is that they are readily available commercially. But inks containing inorganic pigments (pigment dispersions) may also be used. The choice depends on the type of sol-gel and accordingly on the application of the substrate. If it is designed for use at high temperatures, the sol-gel suitable for this will be cured at a high temperature, and inorganic pigments will have to be used for the dispersion. Organic pigments may preferably be used for lower temperatures. The inks or pigment dispersions may be water-based and/or alcohol-based, as long as they are compatible with the sol-gel.

The invention also relates to an implement with a wall portion formed by at least one substrate provided with a coating obtained by means of a sol-gel process in which a marking was provided in accordance with the method described above.

The invention will be explained with reference to embodiments.

EMBODIMENT 1

This embodiment starts with a substrate made of polyamide (IXEF from the Solvay company) which may form part of a domestic appliance or a personal care appliance, such as an electric shaver, a toothbrush, etc. A sol-gel solution on the basis of TEOS (tetraethylorthosilicate) and GLYMO (3-glycidyloxypropyltrimethoxysilane) is provided on the substrate. The sol-gel layer has a thickness of approximately 10 μm. The ink used is a normal commercially available ink (for example from HP). The drying time at room temperature is approximately 20 minutes. Curing takes place at a temperature of approximately 160° C. The image on the substrate showed a high wear resistance and was resistant to alcohol and MEK (methylethyl ketone).

EMBODIMENT 2

This embodiment starts with an aluminum substrate such as may be used for the sole plate of an electric ion. The substrate should accordingly be suitable for use at elevated temperatures (350° C.). A sol-gel solution on the basis of TEOS (tetraethylorthosilicate) and MTMS (methyltrimethoxysilane) is provided on the aluminum substrate. The ink used is a water-based $Fe_2O_3$ pigment dispersion. The drying time at room temperature is approximately 20 minutes. The ink is provided by an ink jet technology. Curing takes place at a temperature of approximately 350° C. The image obtained complies fully with the wear resistance requirements. The pigments in the image retain their color after exposure to high temperatures (350° C.) for long periods.

The invention claimed is:

1. An appliance having a wall portion formed by at least one substrate provided with a marking derived from a layer of a sol-gel solution, said layer being provided with an ink compatible therewith penetrated into the layer, and cured to form an ink-containing coating wherein the appliance includes at least one of: an electric shaver, an electric toothbrush, and an electric iron.

2. An implement as claimed in claim 1, characterized in that the layer is preliminarily dried before the ink is applied.

3. An implement as claimed in claim 1, characterized in that the ink is provided by means of an ink jet process.

4. An implement as claimed in claim 1, characterized in that the ink used is a water-based and/or alcohol-based ink.

5. An implement as claimed in claim 1, characterized in that organic or inorganic coloring agents or pigments are used to obtain a color effect.

6. An implement having a wall portion formed by at least one substrate provided with a marking derived from a layer of a sol-gel solution, said layer being provided with an ink compatible therewith penetrated into the layer, and cured to form an ink-containing coating, wherein the sol-gel solution is a solution on the basis of tetraethylorthosilicate (TEOS) and one of:

3-glycidyloxypropyltrimethoxysilane (GLYMO), provided on a polyamide substrate; and methyltrimethoxysilane (MTMS), provided on an aluminum substrate.

7. An implement as claimed in claim 6, characterized in that the layer is preliminarily dried before the ink is applied.

8. An implement as claimed in claim 6, characterized in that the ink is provided by means of an ink jet process.

9. An implement as claimed in claim 6, characterized in that the ink used is a water-based and/or alcohol-based ink.

10. An implement as claimed in claim 6, characterized in that organic or inorganic coloring agents or pigments are used to obtain a color effect.

11. An implement according to claim 6, wherein the implement is an electric shaver, an electric toothbrush, or an electric iron.

12. An implement having a wall portion formed by at least one substrate provided with a marking derived from a layer of a sol-gel solution, said layer being provided with an ink compatible therewith penetrated into the layer before the sol-gel solution is cured, thereby forming an ink-containing coating wherein the sol-gel solution is a solution on the basis of tetraethylorthosilicate (TEOS) and 3-glycidyloxypropyltrimethoxysilane (GLYMO) which is provided on a polyamide substrate.

13. An implement as claimed in claim 12, characterized in that the layer is preliminarily dried before the ink is applied.

14. An implement as claimed in claim 12, characterized in that the ink is provided by means of an ink jet process.

15. An implement as claimed in claim 12, characterized in that the ink used is a water-based and/or alcohol-based ink.

16. An implement as claimed in claim 12, characterized in that organic or inorganic coloring agents or pigments are used to obtain a color effect.

17. An implement according to claim 12, wherein the implement is an electric shaver, an electric toothbrush, or an electric iron.

18. An implement having a wall portion formed by at least one substrate provided with a marking derived from a layer of a sol-gel solution, said layer being provided with an ink compatible therewith penetrated into the layer before the sol-gel solution is cured, thereby forming an ink-containing non-absorbent coating wherein the sol-gel solution is a solution on the basis of tetraethylorthosilicate (TEOS) and methyltrimethoxysilane (MTMS) which is provided on an aluminum substrate.

19. An implement as claimed in claim 18, characterized in that the layer is preliminarily dried before the ink is applied.

20. An implement as claimed in claim 18, characterized in that the ink is provided by means of an ink jet process.

21. An implement as claimed in claim 18, characterized in that the ink used is a water-based and/or alcohol-based ink.

22. An implement as claimed in claim 18, characterized in that organic or inorganic coloring agents or pigments are used to obtain a color effect.

23. An implement according to claim 18, wherein the implement is an electric shaver, an electric toothbrush, or an electric iron.

* * * * *